United States Patent
Lee et al.

(10) Patent No.: US 10,557,019 B2
(45) Date of Patent: Feb. 11, 2020

(54) CARBON FIBER-REINFORCED POLYMER COMPOSITE AND METHOD OF PREPARING THE SAME

(71) Applicants: Hyundai Motor Company, Seoul (KR); Kia Motors Corporation, Seoul (KR); Korea University Research and Business Foundation, Seoul (KR)

(72) Inventors: Sung Hyun Lee, Gyeonggi-do (KR); Soon Joon Jung, Seoul (KR); Won Jin Seo, Gyeonggi-do (KR); Dong Uk Lee, Seoul (KR); Ho Gyu Yoon, Seoul (KR); Heun Young Seo, Seoul (KR); Yong Sik Yeom, Gyeonggi-do (KR); Jae Young Lee, Incheon (KR)

(73) Assignees: Hyundai Motor Company, Seoul (KR); Kia Motors Corporation, Seoul (KR); Korea University Research and Business Foundation, Seoul (KR)

( * ) Notice: Subject to any disclaimer, the term of this patent is extended or adjusted under 35 U.S.C. 154(b) by 164 days.

(21) Appl. No.: 15/830,635

(22) Filed: Dec. 4, 2017

(65) Prior Publication Data

US 2019/0071558 A1   Mar. 7, 2019

(30) Foreign Application Priority Data

Sep. 1, 2017  (KR) .................. 10-2017-0112130

(51) Int. Cl.
*C08K 9/08* (2006.01)
*C08K 3/04* (2006.01)
*D06M 15/267* (2006.01)
*C08K 7/06* (2006.01)
*D06M 101/40* (2006.01)

(52) U.S. Cl.
CPC .............. *C08K 9/08* (2013.01); *C08K 3/04* (2013.01); *D06M 15/267* (2013.01); *C08K 7/06* (2013.01); *D06M 2101/40* (2013.01)

(58) Field of Classification Search
CPC ........................................ C08K 9/08
See application file for complete search history.

(56) References Cited

U.S. PATENT DOCUMENTS

2008/0153982 A1* 6/2008 Lai .................... A61K 8/90
525/91

FOREIGN PATENT DOCUMENTS

| CN | 101104653 A | * | 1/2008 |
| KR | 10-1627622 B1 | | 6/2016 |
| KR | 10-1741052 B1 | | 5/2017 |

OTHER PUBLICATIONS

Machine translation of CN 101104653 A, published Jan. 16, 2008.*

* cited by examiner

*Primary Examiner* — Vickey Nerangis
(74) *Attorney, Agent, or Firm* — Mintz Levin Cohn Ferris Glovsky and Popeo, P.C.; Peter F. Corless

(57) ABSTRACT

Provided herein, inter alia, are a carbon fiber-reinforced polymer composite and a method for manufacturing the same. The carbon fiber-reinforced polymer composite may improve interfacial bonding force by modifying the surface of carbon fibers with an amphiphilic block copolymer and then forming a composite of the surface-modified carbon fibers with a polymer.

19 Claims, 6 Drawing Sheets

CARBON FIBER-REINFORCED POLYMER COMPOSITE AND METHOD OF PREPARING THE SAME

CROSS-REFERENCE TO RELATED APPLICATION

This application claims, under 35 U.S.C. § 119(a), the benefit of priority to Korean Patent Application No. 10-2017-0112130 filed on Sep. 1, 2017, the entire contents of which are incorporated herein by reference.

TECHNICAL FIELD

The present invention relates to a carbon fiber-reinforced polymer composite and a method for manufacturing the same. The carbon fiber-reinforced polymer composite may improve interfacial bonding force by modifying carbon fibers, for example, modifying surfaces of the carbon fibers, with an amphiphilic block copolymer and then forming a composite of the surface-modified carbon fibers with a polymer.

BACKGROUND

Continuous research has been underway in the vehicle industry in order to suppress generation of $CO_2$ and improve fuel efficiency. For this purpose, efforts to replace metal components of vehicles with polymer composites have been continuously made. For instance, carbon fiber composites exhibit excellent electrical, thermal and mechanical properties, thus being studied for a variety of applications from the vehicle industry to aerospace.

Carbon fibers are subjected to a final process, surface-treatment, called "sizing", to prevent damage of fibers by friction, improve wettability with thermosetting resins and reduce surface pores in the process of manufacturing. During sizing, the interfacial bonding force with a thermosetting resin such as epoxy may be improved, however, mechanical properties and the like may not be obtained due to bad compatibility with a general thermoplastic resin, e.g., a highly hydrophobic polymer. Accordingly, polymer composites may be reinforced with glass fibers. As such, surface-treatment and compatibility with most polymers may be easily obtained for use in various industries, however, carbon fibers may have limited application to highly hydrophilic polymers such as nylon.

In the related art, disclosed is carbon fibers that are surface-treated using UV-ozone, and the surfaces of carbon fibers are functionalized again with an interfacial bonding agent to improve bonding strength with the resin matrix.

In addition, in the related art, carbon fibers may be treated with nitric acid, a silane-based interfacial bonding agent may be added thereto and the resulting mixture may be mixed with a thermoplastic polymer such as polypropylene to improve bonding strength between the two ingredients.

Likewise, in the related art, pretreatment to remove the sizing agent attached to the surfaces of carbon fibers by treatment with an acid or base, or ozone or plasma, may be conducted and the carbon fibers may be mixed with a polymer to improve bonding strength between carbon fibers and the polymer. However, this pretreatment step may be very dangerous, eliminate inherent properties of carbon fibers and produce a substantial amount of waste after surface-treatment.

The above information disclosed in this Background section is only for enhancement of understanding of the background of the invention and therefore it may contain information that does not form the prior art that is already known in this country to a person of ordinary skill in the related art.

SUMMARY OF THE INVENTION

In preferred aspects, provided are a method for manufacturing a carbon fiber-reinforced polymer composite that can improve interfacial bonding force between carbon fibers and the polymer without conducting pretreatment of the carbon fibers and a carbon fiber-reinforced polymer composite which may have significantly improved mechanical properties such as tensile strength.

The objects of the present invention are not limited to those described above. The objects of the present invention will be clearly understood from the following description and could be implemented by means defined in the claims and a combination thereof.

In one aspect, provided is a method for manufacturing a carbon fiber-reinforced polymer composite. The method may include i) modifying carbon fibers with a block copolymer represented by the following Formula 1 or 2, and ii) mixing the surface-modified carbon fibers with a polymer.

In certain embodiments, Formula 1 is:

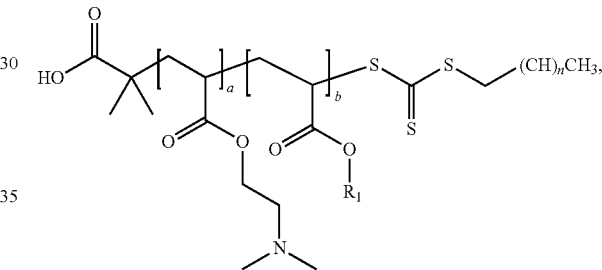

wherein, in Formula 1, a is an integer of 10 to 50 and b is an integer satisfying $a \leq b \leq 50$; and
$R_1$ is $C_1$-$C_{20}$ alkyl such as methyl or ethyl and n is an integer of 1 to 10, In certain embodiments, Formula 2 is:

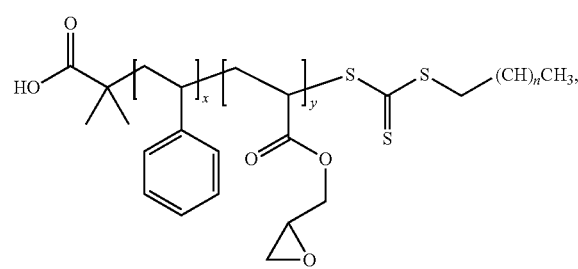

wherein x is an integer of 50 to 90 and y is an integer satisfying $10 \leq y \leq x \leq 90$ in and n is an integer of 1 to 10.

Preferably, the carbon fibers may have at least one epoxy group on the surfaces thereof or may have no epoxy group on the surfaces thereof.

When the carbon fibers have at least one epoxy group, the carbon fibers may be suitably modified on surfaces thereof with about 100 parts by weight to 500 parts by weight of the block copolymer, based on 100 parts by weight of the epoxy group.

When the carbon fibers have no epoxy group, the carbon fibers may be suitably modified on surfaces thereof with about 0.5 parts by weight to 5.0 parts by weight of the block copolymer, based on 100 parts by weight of the epoxy group.

The block copolymer may suitably have a weight average molecular weight of about 10,000 to 50,000 g/mol.

The carbon fibers may be modified by steps comprising: dispersing the carbon fibers in a first solvent to form a dispersion, dissolving the block copolymer in a second solvent to form a polymer solution, mixing the dispersion with the solution to form a mixture, and stirring the mixture at a temperature of about 70° C. to 90° C. for about 2 to 4 hours.

The carbon fibers may be modified by steps comprising: dissolving the block copolymer in a solvent having a polarity of about 2.4 to 9.0 to form a polymer solution, spraying the polymer solution on surfaces of the carbon fibers, and mixing the carbon fibers with the solution at a temperature of about 70° C. to 90° C. for about 2 to 4 hours.

The polymer may be a thermoplastic or thermosetting polymer.

Preferably, an amount of about 5% by weight to 55% by weight of the surface-modified carbon fibers may be mixed with an amount of about 45% by weight to 95% by weight of the polymer, all the % by weights based on the total weight of the carbon fiber-reinforced polymer composite.

The surface-modified carbon fibers may be mixed with the polymer at a temperature of about 150° C. to 300° C. for about 30 minutes to 2 hours.

The method may further include mixing the modified carbon fibers and the polymer with an additive selected from the group consisting of maleic anhydride-grafted polypropylene, a glass fiber, an antioxidant and a combination thereof.

In another aspect, provided is a carbon fiber-reinforced polymer composite that may include a polymer, and carbon fibers that may be modified with a block copolymer.

In certain embodiments, Formula 1 is:

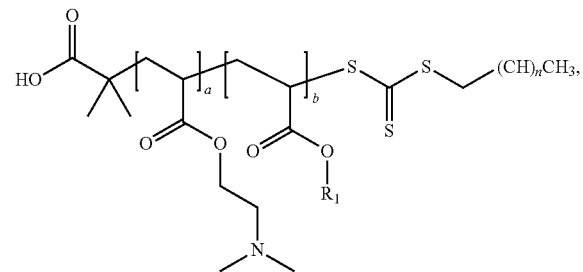

wherein, in Formula 1, a is an integer of 10 to 50 and b is an integer satisfying a≤b≤50;

and $R_1$ is methyl or ethyl and n is an integer of 1 to 10.

In certain embodiments, Formula 2 is:

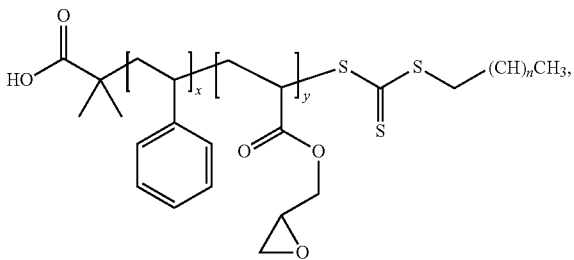

wherein, in Formula 2, x is an integer of 50 to 90 and y is an integer satisfying 10≤y≤x≤90; and n is an integer of 1 to 10.

Preferably, the carbon fibers may be dispersed in the polymer.

The polymer may suitably be a thermoplastic or thermosetting polymer.

The block copolymer may suitably a weight average molecular weight of about 10,000 to 50,000 g/mol.

The polymer composite material may suitably may include: an amount of about 45% by weight to 95% by weight of the polymer; and an amount of about 5% by weight to 55% by weight of the surface-modified carbon fibers, all the % by weights based on the total weight of the polymer composite material.

The polymer composite material may further include an additive which may be dispersed in the polymer and may be selected from the group consisting of maleic anhydride-grafted polypropylene, a glass fiber, an antioxidant and a combination thereof.

Further provided is a polymer composite material that is obtainable from or obtained by a method as described herein.

Also provided is a component for a vehicle that may include the carbon fiber-reinforced polymer composite as described herein. The component may be selected from the group consisting of a seat frame, a roof frame, a cross beam and a combination thereof.

Further provided herein is a vehicle comprising the component as described herein. Other aspects of the invention are disclosed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

Figure 1:
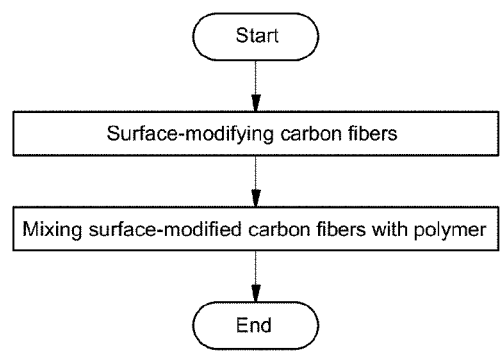
FIG. 1 shows an exemplary method for manufacturing an exemplary carbon fiber-reinforced polymer composite according to an exemplary embodiment of the present invention.

The objects described above, and other objects, features and advantages will be clearly understood from the following preferred embodiments with reference to the annexed drawings. However, the present invention is not limited to the embodiments and will be embodied in different forms. The embodiments are suggested only to offer thorough and complete understanding of the disclosed context and sufficiently inform those skilled in the art of the technical concept of the present invention.

Like numbers refer to like elements throughout the description of the figures. In the drawings, the sizes of structures are exaggerated for clarity. It will be understood that, although the terms first, second, etc. may be used herein to describe various elements, these elements should not be limited by these terms and are used only to distinguish one element from another. For example, within the scope defined by the present invention, a first element may be referred to as a second element and similarly, the second element may be referred to as the first element. Singular forms are intended to include plural forms as well, unless context clearly indicates otherwise.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 shows an exemplary a method for manufacturing an exemplary carbon fiber-reinforced polymer composite according to an exemplary embodiment of the present invention.

For instance, the method for manufacturing the carbon fiber-reinforced polymer composite may include modifying the carbon fibers, for example, surfaces of carbon fibers, with an amphiphilic block copolymer and mixing the surface-modified carbon fibers with a polymer.

The carbon fibers may be dispersed in the polymer and form a composite with the polymer, thereby improving mechanical properties such as tensile strength. The carbon fibers may be long fibers that have a length of about 4 mm to 8 mm.

The carbon fiber may include an epoxy group which may be attached to the surface thereof by sizing, or may have not it. Preferably, the carbon fibers may not be subjected to pretreatment such as treatment with an acid or base, or ozone or plasma that do not remove the epoxy group formed by sizing. For reference, the "carbon fibers having no epoxy groups attached thereto by sizing", "carbon fibers having no epoxy groups attached thereto" or the like may include carbon fibers, epoxy groups of which are removed by sizing after pretreatment as well as carbon fibers that are not subjected to sizing.

Hereinafter, the term "carbon fibers", as used herein, refers to carbon fibers before surface-modification with a block copolymer and the term "modified carbon fibers" or "surface-modified carbon fibers" means carbon fibers modified or surface-modified with a block copolymer. That is, the two terms are clearly used in different meanings.

The carbon fibers may be surface-modified with an amphiphilic block copolymer represented by the following Formula 1 or 2:

[Formula 1]

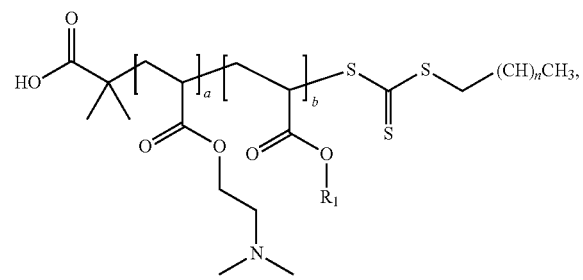

wherein a is an integer of 10 to 50 and b is an integer satisfying a≤b≤50; and

R$_1$ is methyl or ethyl and n is an integer of 1 to 10,

[Formula 2]

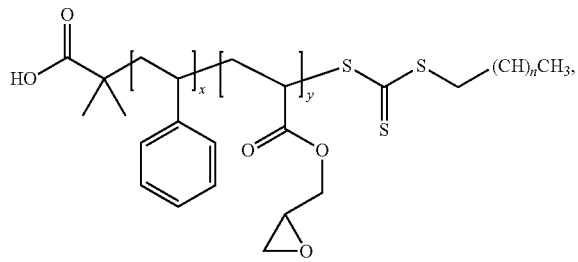

wherein x is an integer of 50 to 90 and y is an integer satisfying 10≤y≤x≤90; and n is an integer of 1 to 10.

The block copolymer represented by Formula 1 may include a unit structure having a tertiary amine group. Accordingly, when the surface of carbon fiber is modified with a block copolymer, the tertiary amine group may react with the epoxy group that may be attached to the surface of carbon fiber by sizing. Accordingly, deterioration in compatibility with a hydrophobic polymer caused by the epoxy group may be prevented.

In Formula 1, a means a polymerization degree of the unit structure including a tertiary amine and may be preferably an integer of 10 to 50. When a is less than 10, improvement in interfacial bonding force between the surface-modified carbon fiber and the polymer may be insufficient and, when a is greater than 50, compatibility between the surface-modified carbon fiber and the polymer may be deteriorated.

The block copolymer represented by Formula 2 may include a unit structure including an epoxy group. Accordingly, when the surface of carbon fiber is modified with a block copolymer, the epoxy group may react with an epoxy group attached by sizing to the surface of the carbon fiber. As such, deterioration in compatibility between the hydrophobic polymer and the epoxy group attached to the carbon fiber may be prevented.

In Formula 2, y means a polymerization degree of a unit structure including an epoxy group and may preferably be an integer satisfying 10≤y≤x≤90. In Formula 2, x may be a polymerization degree of polystyrene and may preferably be an integer of 50 to 90. When x and y satisfy the conditions defined above, the interfacial bonding force between the surface-modified carbon fiber and the polymer may be sufficiently improved and the problem of compatibility deterioration can be prevented.

The block copolymer represented by Formula 1 may include both a hydrophilic ion group (e.g., unit structure including a tertiary amine group) and a hydrophobic ion group (e.g., unit structure including R$_1$) and the block copolymer represented by Formula 2 also may include both a hydrophilic ion group (unit structure including an epoxy group) and a hydrophobic ion group (polystyrene). In other words, the block copolymer may suitably be an amphiphilic block copolymer. Accordingly, carbon fibers surface-modified using the same may be homogeneously dispersed in a hydrophilic polymer as well as a thermoplastic hydrophobic polymer such as polyolefin, thereby significantly improving interfacial bonding force and mechanical properties of the composite material.

The block copolymer represented by Formula 1 or Formula 2 may have a weight average molecular weight of about 10,000 g/mol to 100,000 g/mol, of about 10,000 g/mol to 50,000 g/mol, or particularly of about 10,000 g/mol to 30,000 g/mol. When the weight average molecular weight is less than about 10,000 g/mol, compatibility with the polymer may be deteriorated due to excessively low molecular weight and when the weight average molecular weight is greater than about 100,000 g/mol, surface modification may not be sufficient and the block copolymer may serve as a bond.

The block copolymer represented by Formula 1 or Formula 2 may be obtained by reacting a monomer corresponding to a unit structure with a chain transfer agent represented by the following Formula 3:

[Formula 3]

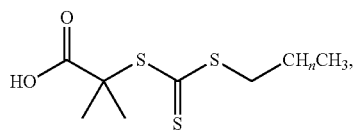

wherein n is an integer of 1 to 10.

Preferably, the block copolymer may be obtained by reacting the chain transfer agent represented by the following Formula 3 with a reaction initiator in a solvent such as toluene and then, sequentially or simultaneously, adding respective monomers to the solution, followed by reacting. The synthesis method of the block copolymer is not limited thereto.

The surface modification of carbon fibers may be carried out by wet treatment or dry treatment.

Figure 2:
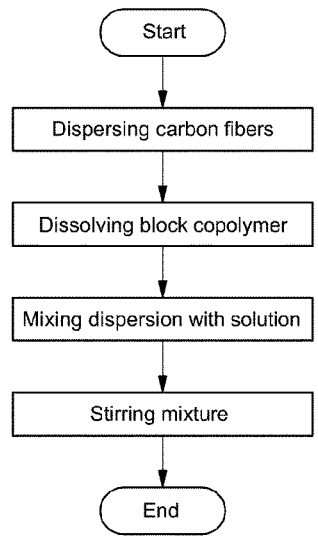
FIG. 2 shows an exemplary method of modifying surfaces of exemplary carbon fibers by wet treatment according to an exemplary embodiment of the present invention.

FIG. 2 shows an exemplary method of surface-modifying carbon fibers by wet treatment. For instance, the method of surface-modifying carbon fibers may include dispersing carbon fibers in a solvent to form a dispersion, dissolving the block copolymer in a solvent for a polymer solution, mixing the dispersion with the copolymer solution to form a mixture, and stirring the mixture under certain conditions.

The solvent used for dispersing the carbon fibers may be changed depending on the type of the carbon fibers. When the epoxy group is attached to the surface of the carbon fiber by sizing, a non-polar solvent may be used to prevent the epoxy group from being dissolved and when the epoxy group is not attached, a solvent having a polarity of about 2.4 to 9.0 may be used.

In addition, the solvent for dissolving the block copolymer may preferably be the same solvent as in the step of dispersing the carbon fibers for homogeneously mixing the dispersion with the solution. The block copolymer may suitably be an amphiphilic block copolymer and be easily dissolved in any solvent in the related art.

Then, the mixture of the carbon fiber dispersion and the block copolymer solution may be stirred at a temperature of about 70° C. to 90° C. for about 2 to 4 hours to modify the surfaces of carbon fibers. When the stirring temperature is less than about 70° C. or the stirring time is less than about 2 hours, surface-modification of the carbon fibers may not be sufficiently performed, and when the stirring temperature is less than about 90° C. or the stirring time is greater than about 4 hours, the surface-modification may be excessive.

Figure 3:
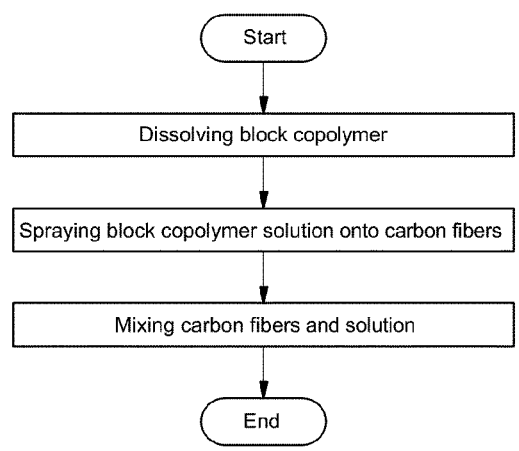
FIG. 3 shows an exemplary method of modifying surfaces of exemplary carbon fibers by dry treatment according to an embodiment of the present invention.

FIG. 3 shows a method of surface-modifying carbon fibers by dry treatment. For instance, the method of surface-modifying carbon fibers may include dissolving a block copolymer in a second solvent to form a polymer solution, spraying the polymer solution onto surface of the carbon fibers, and mixing the carbon fibers with the solution under certain conditions.

The solvent used for dissolving the block copolymer is not particularly limited due to the properties of the amphiphilic block copolymer, but may be a solvent having a polarity of about 2.4 to 9.0.

Before spraying the block copolymer solution onto carbon fibers, the method may further include separating or grinding the carbon fibers using a mixer or the like, which may increase the contact area between the carbon fibers and the solution.

The method of spraying the solution is not particularly limited and may be suitably changed depending on the type and amount of solvent, the amount of carbon fibers and the like.

After spraying the solution onto the carbon fibers, the carbon fibers and the solution may be mixed (stirred) at a temperature of about 70° C. to 90° C. for about 2 to 4 hours to surface-modify the carbon fibers. When the stirring temperature is less than about 70° C. or the stirring time is less than about 2 hours, carbon fibers may not be surface-modified, and when the stirring temperature is greater than about 90° C. or the stirring time is greater than about 4 hours, the surface-modification may be excessive. Any mixing method may be used without particular limitation so long as the carbon fibers may suitably contact and react with the solution sprayed thereon.

The amount of solvent used for surface-modifying carbon fibers is not particularly limited. In wet treatment, the solvent may be used in an amount enabling the carbon fibers to be sufficiently impregnated and dispersed. In dry treatment, the solvent may be used in an amount allowing the solvent to be sprayed. After dry treatment is completed, the amount of solvent may preferably limited to a minimum for easy removal.

The amount of block copolymer used for surface-modifying carbon fibers may be changed depending on the type of carbon fibers. For instance, the amount of block copolymer may depend on whether or not carbon fibers include an epoxy group by sizing.

The carbon fibers including at least one epoxy group by sizing on the surface thereof, which may not be pretreated, may be surface-modified with about 100 parts by weight to 500 parts by weight of the block copolymer, based on 100 parts by weight of the epoxy group. The weight of the epoxy group may be about 1.4% by weight relative to the total weight of the carbon fibers.

The carbon fibers having no epoxy group by sizing on the surface thereof carbon fibers, the epoxy group of which is removed by pretreatment, or carbon fibers not undergoing sizing may be surface-modified with about 0.5 parts by weight to 5.0 parts by weight of the block copolymer, based on 100 parts by weight of the epoxy group.

The present invention may provide a carbon fiber-reinforced polymer composite with superior mechanical properties such as tensile strength by mixing the carbon fibers surface-modified with the block copolymer represented by Formula 1 or Formula 2, with a polymer, to improve the interfacial bonding force between the carbon fibers and the polymer.

The polymer may be a thermoplastic or thermosetting polymer. Preferably, the polymer may be a thermoplastic polymer such as polyethylene, polypropylene or polystyrene, or a thermosetting polymer such as a phenolic resin, polyester, or polyurethane.

The mixing between the surface-modified carbon fibers and the polymer may be carried out by mixing an amount of about 5% by weight to 55% by weight of the surface-modified carbon fibers with an amount of about 45% by weight to 95% by weight of the polymer, all the % by weight based on the total weight of the carbon fiber-reinforced polymer composite. When the content of the surface-modified carbon fibers is less than about 5% by weight, improvement in mechanical properties of the carbon fiber-reinforced polymer composite may not be sufficient, and when the content is greater than about 55% by weight, components by molding such as injection molding may not be produced.

The mixing between the surface-modified carbon fibers and the polymer may be carried out at a temperature of about 150° C. to 300° C. for about 30 minutes to 2 hours. In addition, the mixing method is not particularly limited and is for example carried out suitably using a kneader or the like.

When mixing the surface-modified carbon fibers with the polymer, an additive selected from the group consisting of maleic anhydride-grafted polypropylene, glass fiber, an antioxidant and a combination thereof may be further added.

Maleic anhydride-grafted polypropylene may be an ingredient to further improve interfacial bonding force between the carbon fibers and the polymer and may be added in an amount of about 12% by weight or less based on the total weight of the carbon fiber-reinforced polymer composite. When the content is greater than about 12% by weight, tensile strength or the like of the carbon fiber-reinforced polymer composite may be deteriorated due to low mechanical properties of maleic anhydride-grafted polypropylene.

The glass fiber may be an ingredient to further improve mechanical properties of the carbon fiber-reinforced polymer composite and may be added such that the total amount of the surface-modified carbon fibers and the glass fiber may be about 70% by weight or less based on the total weight of the carbon fiber-reinforced polymer composite.

The carbon fiber-reinforced polymer composite according to an exemplary embodiment of the present invention manufactured by the method described herein may include carbon fibers that may be dispersed in the polymer and are modified or surface-modified with the block copolymer represented by Formula 1 or Formula 2 as described above. The polymer and block copolymer have been described above and a detailed explanation thereof will be omitted.

According to various exemplary embodiments of the present invention, the method for manufacturing a carbon fiber-reinforced polymer composite may include surface-treating carbon fibers, which are subjected to sizing (surface-treatment) with an epoxy resin or the like, with a block copolymer including a tertiary amine group or epoxy group, and then mixing the surface-modified carbon fibers with a thermoplastic or thermosetting polymer. As a result, the interfacial bonding force between the surface-modified carbon fibers and the polymer may be greatly improved so that a carbon fiber-reinforced polymer composite with excellent mechanical properties such as tensile strength may be provided.

In the related art, by a conventional method, carbon fibers sized with an epoxy resin or the like are treated with an acid or base, or ozone or plasma to remove the epoxy groups attached to the surfaces of carbon fibers and then the carbon fibers are treated with a compatibilizer to improve compatibility between the carbon fibers and the polymer. As a result, the properties of carbon fibers may be inevitably removed and mass-production may not be obtained. However, the present invention can improve interfacial bonding force without the pretreatment described above, thus maintaining inherent properties of carbon fibers and being advantageous in mass-production.

Hereinafter, the present invention will be described in more detail with reference to examples. However, these examples are provided only for illustration of the present invention and should not be construed as limiting the scope of the present invention.

Example 1

1. Preparation of Block Copolymer Represented by Formula 1

4 g of a chain transfer agent represented by Formula 3 (n=10) and 0.2 g of azobisisobutyronitrile (AIBN) as a reaction initiator were charged in a 500 ml flask and stirred under vacuum for about 30 minutes. Then, the moisture was sufficiently removed, toluene was added thereto and the resulting mixture was thoroughly stirred at room temperature (25° C.) and about 300 RPM until the chain transfer agent and the reaction initiator were sufficiently dissolved. 0.2 mol of dimethyl aminoethyl methacrylate (DMAEMA, Sigma-Aldrich) monomer (in Formula 1, polymerization degree a=38) was purged with argon gas and then was added to the solution including the chain transfer agent and the reaction initiator, and reaction was conducted in an oil bath maintained at a temperature of about 80° C. for 16 hours.

Then, 1 mol of a methyl methacrylate (MMA, Sigma-Aldrich) monomer (in Formula 1, polymerization degree b=50) was also purged with argon gas and was added to the solution, and reaction was conducted under the same conditions for about 24 hours to synthesize a block copolymer.

Finally, the synthesized block copolymer was diluted with a tetrahydrofuran solvent and was then precipitated portionwise in a hexane solvent.

After the precipitate was filtered through a Teflon filter having a size of 0.2 μm, the residue was dissolved in tetrahydrofuran again and the filtration was repeated three times to remove unreacted monomer. The finally filtered block copolymer was dried in a vacuum oven at a temperature of about 50° C. for about one day.

2. Modification/Wet-Treatment of Surface of Carbon Fibers with Block Copolymer

Sized carbon fibers (Toray Carbon Fiber America Co., T-700S) were dispersed in a xylene solvent by mechanical mixing to obtain a dispersion.

Also, the block copolymer obtained by the method described above was dissolved in xylene to prepare a solution.

At this time, the block copolymer was dissolved in an amount of 300 parts by weight, based on 100 parts by weight of the epoxy group included in the sized carbon fibers.

The dispersion was mixed with the solution and stirred by a mechanical method at a temperature of a temperature of about 80° C. for about 3 hours. After stirring, the resulting product was washed with xylene three times and dried at room temperature (25° C.) for about 24 hours to obtain carbon fibers surface-modified with a block copolymer.

3. Mixing of Surface-Modified Carbon Fibers with Polymer

20% by weight of the surface-modified carbon fibers obtained by the method were mixed with 80% by weight of polypropylene (GS Caltex Co., Ltd., H550). Specifically, the mixing was carried out using a kneader at a temperature of about 200° C. for about 40 minutes to obtain a carbon fiber-reinforced polymer composite.

The carbon fiber-reinforced polymer composite was melt-mixed in an ordinary extruder at a temperature of about 200° C. and then pelletized. As a result, the pellet-shaped carbon fiber-reinforced polymer composite was injection molded to produce a specimen.

Comparative Example 1

A specimen for the carbon fiber-reinforced polymer composite was produced in the same manner as in Example 1, except that the sized carbon fibers were mixed with polypropylene, without surface modification of the carbon fibers.

Test Example 1

1. X-Ray Photoelectron Spectroscopy (XPS) Analysis

Figure 4A:
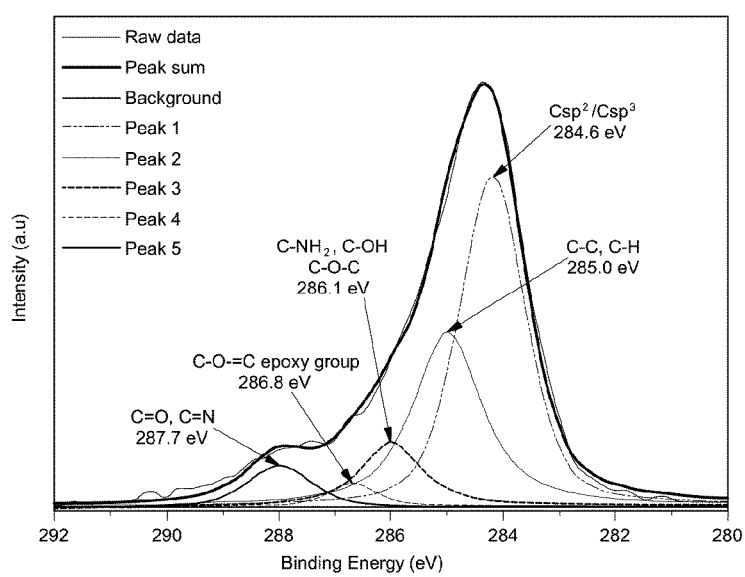
FIG. 4A shows X-ray photoelectron spectroscopy (XPS) analysis results regarding surfaces of exemplary carbon fibers surface-modified with an exemplary block copolymer obtained in Example 1 according to an exemplary embodiment of the present invention.

The carbon fibers surface-modified with the block copolymer obtained in Example 1 were analyzed by XPS. Results are shown in FIG. 4A. In addition, the surface of sized carbon fibers of Comparative Example 1 was analyzed by XPS. Results are shown in FIG. 4B.

Figure 4B:
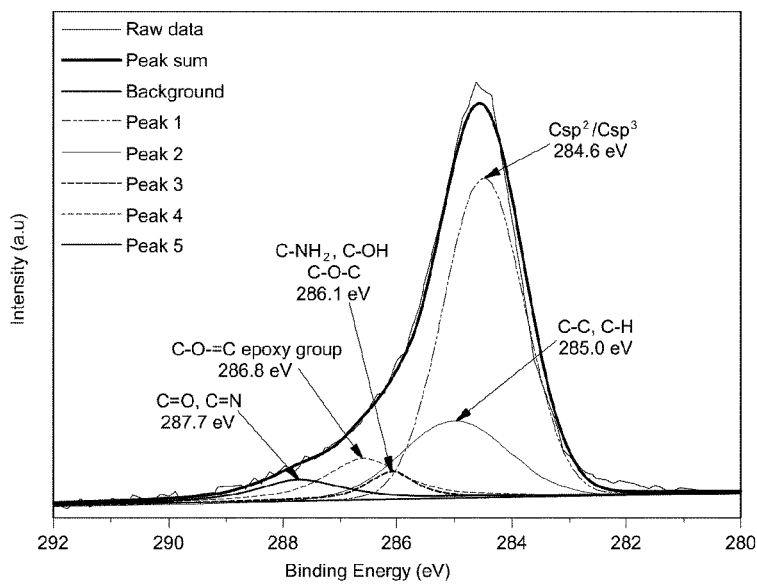
FIG. 4B shows X-ray photoelectron spectroscopy (XPS) analysis results regarding surfaces of carbon fibers surface-modified with a block copolymer obtained in Comparative Example 1.

The peak at 286.6 eV of the epoxy group present on the surface of sized carbon fibers of FIG. 4B was significantly decreased, compared to results of XPS analysis of the surface of carbon fibers surface-modified with a block copolymer of FIG. 4A. Also, peaks at 286.1 eV (C—O—C) and 287.7 eV(C=O) corresponding to the structure of the block copolymer in FIG. 4A were significantly increased, compared to FIG. 4B.

This indicates that, in Example 1, the epoxy group attached to the surface of sized carbon fiber reacts with a tertiary amine group of the block copolymer so that the block copolymer is efficiently functionalized on the surface of carbon fiber.

2. Measurement of Mechanical Properties

The tensile strength, tensile modulus and elongation of specimens obtained in Example 1 and Comparative Example 1 were measured. Specifically, these properties were measured at room temperature (25° C.) at a tensile rate of 50 mm/min in accordance with ASTM D 638. Results are shown in the following Table 1.

TABLE 1

| Items | Tensile strength [MPa] | Tensile modulus [GPa] | Elongation [%] |
|---|---|---|---|
| Polypropylene | 41.3 ± 3.4 | 1.4 ± 0.2 | 12.0 ± 1.1 |
| Comparative Example 1 | 77.0 ± 2.2 | 7.5 ± 0.9 | 1.7 ± 0.1 |
| Example 1 | 106.1 ± 7.1 | 8.9 ± 0.2 | 1.5 ± 0.2 |

Referring to the drawing, the tensile strength of the specimen according to Example 1 was 106.1 MPa on average, which was an about 37.8% increase over the specimen according to Comparative Example 1. This was due to improved interfacial bonding force between the carbon fibers surface-modified with a block copolymer and the polymer (polypropylene).

3. SEM (Scanning Electron Microscopy) Analysis

Figure 5A:
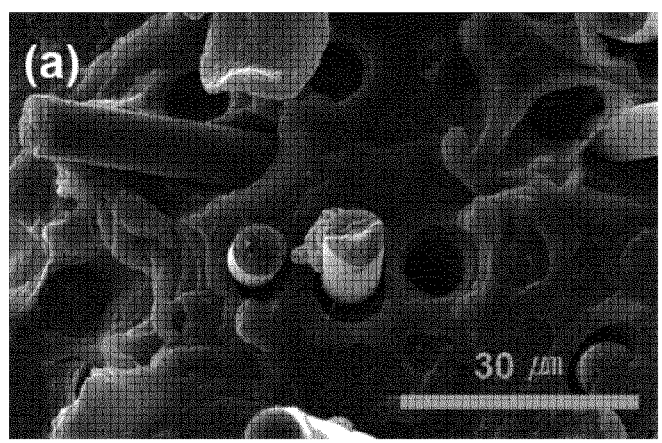
FIG. 5A shows SEM (scanning electron microscopy) analysis results regarding fracture surface of a specimen obtained in Comparative Example 1.
Figure 5B:
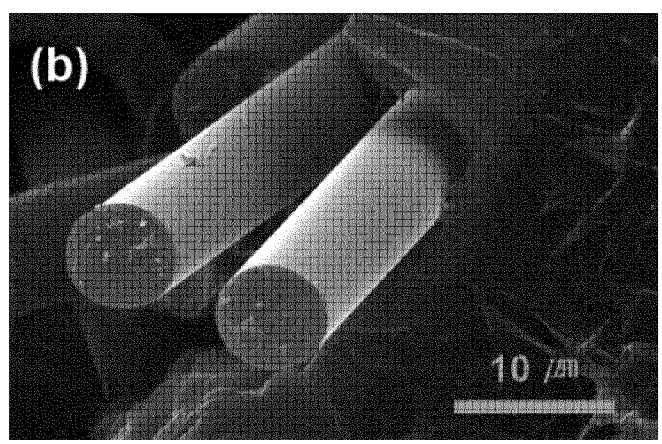
FIG. 5B shows SEM analysis results regarding the fracture surface of the specimen obtained in Comparative Example 1 according to the present invention.
Figure 5C:
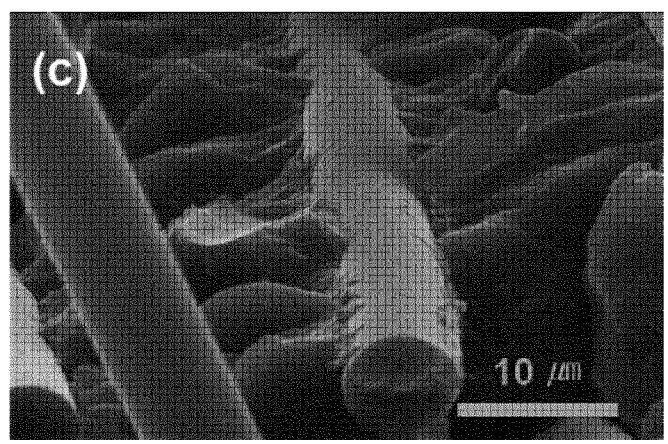
FIG. 5C shows SEM analysis results regarding an exemplary fracture surface of an exemplary specimen obtained in Example 1 according to an exemplary embodiment of the present invention.
Figure 5D:
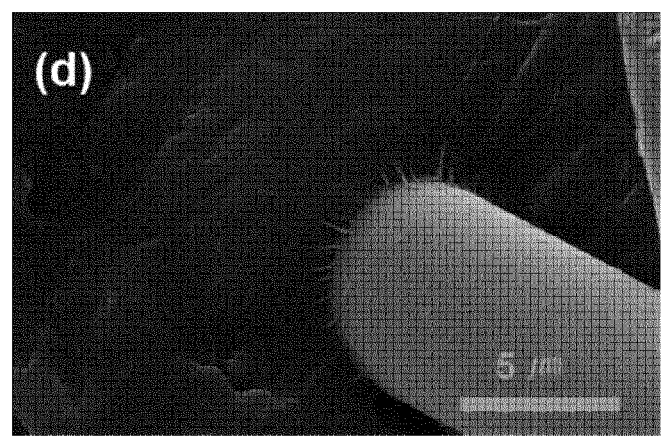
FIG. 5D shows SEM analysis results regarding an exemplary fracture surface of an exemplary specimen obtained in Example 1 according to an exemplary embodiment of the present invention.

The fracture surfaces of specimens according to Example 1 and Comparative Example 1 were measured by SEM. Results are shown in FIGS. 5A to 5B. Specifically, FIGS. 5A and 5B show results of Comparative Example 1 and FIGS. 5C and 5D show results of Example 1.

As shown in FIGS. 5A-5D, in case of the specimen according to Comparative Example 1, the interface between the carbon fibers and the polymer was bad and separated, but in case of the specimen according to Example 1, the surface-modified carbon fibers were well bonded to the polymer without any gap.

As can be seen from Test Example 1, according to an embodiment of the present invention, a carbon fiber-reinforced polymer composite that exhibited excellent mechanical strength such as tensile strength may be obtained due to excellent interfacial bonding force between the ingredients.

Examples 2 to 7

A specimen was produced in the same manner as in Example 1 by changing conditions such as molecular weight of block copolymer, polymerization degree, and treated content.

First, the block copolymer shown in the following Table 2 was prepared and the surfaces of sized carbon fibers were modified with the block copolymer.

TABLE 2

| Items | Carbon fibers | Block copolymer | | | | Modification method |
|---|---|---|---|---|---|---|
| | | Type | Polymerization degree | Molecular weight [g/mol] | Content[1] | |
| Example 2 | sp-CF[2] | Formula 1 | a = 20, b = 70 | 11,500 | 100 parts by weight | Wet |
| Example 3 | sp-CF | Formula 1 | a = 40, b = 50 | 11,500 | 100 parts by weight | Wet |
| Example 4 | sp-CF | Formula 1 | a = 20, b = 70 | 11,500 | 300 parts by weight | Wet |
| Example 5 | sp-CF | Formula 1 | a = 40, b = 50 | 11,500 | 300 parts by weight | Wet |
| Example 6 | sp-CF | Formula 1 | a = 20, b = 70 | 19,800 | 300 parts by weight | Wet |
| Example 7 | sp-CF | Formula 1 | a = 20, b = 70 | 28,400 | 300 parts by weight | Wet |

[1]is based on 100 parts by weight of the epoxy group included in sized carbon fibers of Table 2
[2]means sized pristine carbon fibers Then, the carbon fibers were mixed with a polymer (polypropylene) in the same manner as in Example 1 to produce a specimen for the carbon fiber-reinforced polymer composite.

Test Example 2

The tensile strength, tensile modulus and elongation of specimens according to Example 2 to Example 7 were measured. Measurement methods are the same as in Test Example 1. Results are shown in the following Table 3.

TABLE 3

| Items | Tensile strength [MPa] | Tensile modulus [GPa] | Elongation [%] |
|---|---|---|---|
| Example 2 | 98.6 ± 4.1 | 8.3 ± 0.2 | 1.7 ± 0.2 |
| Example 3 | 101.1 ± 1.4 | 8.4 ± 0.4 | 1.7 ± 0.1 |
| Example 4 | 102.7 ± 2.7 | 8.1 ± 0.1 | 1.6 ± 0.1 |
| Example 5 | 108.0 ± 1.1 | 9.1 ± 0.2 | 1.6 ± 0.1 |
| Example 6 | 118.0 ± 1.6 | 9.3 ± 0.1 | 1.6 ± 0.1 |
| Example 7 | 120.2 ± 4.2 | 9.4 ± 0.6 | 1.7 ± 0.2 |

The results of Examples 2, 6 and 7 demonstrate that, as molecular weight of the block copolymer increased, mechanical properties such as tensile strength were improved.

In addition, comparing the result of Example 2 with the result of Example 3, or comparing the result of Example 4 with the result of Example 5, as the polymerization degree (a) of a unit structure including a tertiary amine group increased, mechanical properties were improved. Also, comparing the result of Example 2 with the result of Example 4, or comparing the result of Example 3 with the result of Example 5, as the amount of treated block copolymer increases, mechanical properties were improved.

Examples 8 and 9

A specimen for the carbon fiber-reinforced polymer composite was produced in the same manner as in Example 4 except that maleic anhydride-grafted polypropylene (Sigma-Aldrich, MAH graft ratio; 0.6% by weight) was added in the step of mixing the surface-modified carbon fibers with the polymer (polypropylene). The compositions of respective ingredients are shown in the following Table 4.

TABLE 4

| Items | Polymer | Surface-modified carbon fibers | Maleic anhydride-grafted polypropylene |
|---|---|---|---|
| Example 8 | 76.3% by weight | 19.1% by weight | 4.6% by weight |
| Example 9 | 75.2% by weight | 18.8% by weight | 6.0% by weight |

Test Example 3

The tensile strength, tensile modulus and elongation of specimens according to Example 8 and 9 were measured. Measurement methods are the same as in Test Example 1. Results are shown in the following Table 5.

TABLE 5

| Items | Tensile strength [MPa] | Tensile modulus [GPa] | Elongation [%] |
|---|---|---|---|
| Example 4 | 102.7 ± 2.7 | 8.1 ± 0.1 | 1.6 ± 0.1 |
| Example 8 | 123.5 ± 3.2 | 9.1 ± 0.2 | 1.7 ± 0.1 |
| Example 9 | 128.4 ± 2.7 | 9.4 ± 0.3 | 1.6 ± 0.1 |

Referring to the drawing, when maleic anhydride-grafted polypropylene was further added, at least the tensile strength of the surface-modified carbon fibers was substantially improved.

Examples 10 and 11

The surfaces of carbon fibers were modified by dry treatment rather than wet treatment and the carbon fibers were treated with an acid before modification to remove the epoxy groups by sizing attached to the surfaces thereof. A detailed manufacturing method will be described below.

1. Treatment of Carbon Fibers

Unlike Examples 1 to 9, carbon fibers used herein were obtained by stirring the sized carbon fibers in a solution of nitric acid, sulfuric acid, and deionized water in a volume ratio of 1:3:3 at a temperature of 80° C. for about 2 hours, washing with deionized water three times and drying at a temperature of 80° C. for about 12 hours to remove the epoxy group.

2. Modification/Dry Treatment of Surfaces of Carbon Fibers with Block Copolymer A solution was obtained by dissolving the block copolymer in xylene. At this time, the block copolymer was dissolved in an amount of 2 parts by weight, with respect to 100 parts by weight of the carbon fibers.

The solution was homogeneously sprayed onto the carbon fibers obtained by the method and mechanically mixed at a temperature of 80° C. for about 3 hours to modify the carbon fibers. The carbon fibers and block copolymer used in the process are shown in the following Table 6.

TABLE 6

|  | Carbon fiber | Block copolymer | | | | Modification method |
|---|---|---|---|---|---|---|
| Items |  | Type | Polymerization degree | Molecular weight [g/mol] | Content[1] |  |
| Example 10 | a-CF[2] | Formula 1 | a = 20, b = 70 | 11,500 | 2 parts by weight | Wet |
| Example 11 | a-CF | Formula 1 | a = 20, b = 70 | 19,800 | 2 parts by weight | Wet |

[1] is based on 100 parts by weight of the epoxy group included in sized carbon fibers of Table 6
[2] means acid-treated sized carbon fiber Then, a carbon fiber-reinforced polymer composite was produced in the same manner as in Example 1.

Test Example 4

The tensile strength, tensile modulus and elongation of specimens according to Examples 10 and 11 were measured. Measurement methods are the same as in Test Example 1. Results are shown in the following Table 7.

TABLE 7

| Items | Tensile strength [MPa] | Tensile modulus [GPa] | Elongation [%] |
|---|---|---|---|
| Example 10 | 111.1 ± 2.2 | 9.0 ± 0.2 | 1.7 ± 0.2 |
| Example 11 | 119.9 ± 2.5 | 9.3 ± 0.2 | 1.6 ± 0.2 |

Referring to the drawing, although carbon fibers wherein the epoxy group attached to the surface thereof was removed by acid treatment were used and the carbon fibers were surface-modified by dry treatment, substantially the same or similar results to Examples 1 to 7 may be obtained.

Examples 12 and 13

The carbon fibers were surface-modified with a block copolymer represented by Formula 2 and then mixed with a polymer to produce a carbon fiber-reinforced polymer composite.

The block copolymers prepared in Examples 12 and 13 are shown in the following Table 8.

TABLE 8

| Items | Carbon fiber | Block copolymer ||| Modification method |
| | | Type | Polymerization degree | Molecular weight [g/mol] | Content[1] | |
|---|---|---|---|---|---|---|
| Example 12 | sp-CF[2] | Formula 2 | x = 70, y = 30 | 19,800 | 100 parts by weight | Wet |
| Example 13 | sp-CF | Formula 2 | x = 70, y = 30 | 19,800 | 300 parts by weight | Wet |

[1] is based on 100 parts by weight of the epoxy group included in sized carbon fibers of Table 8
[2] means sized pristine carbon fibers Test Example 5

The tensile strength, tensile modulus and elongation of specimens according to Examples 12 and 13 were measured. Measurement methods are the same as in Test Example 1. Results are shown in the following Table 9.

TABLE 9

| Items | Tensile strength [MPa] | Tensile modulus [GPa] | Elongation [%] |
|---|---|---|---|
| Example 12 | 108.0 ± 1.7 | 8.7 ± 0.2 | 1.7 ± 0.1 |
| Example 13 | 118.0 ± 1.6 | 9.3 ± 0.1 | 1.6 ± 0.1 |

Referring to the drawing, although the block copolymer represented by Formula 2 was used, substantially the same or similar results to Examples 1 to 7 may be obtained.

Hereinbelow, although embodiments of the present invention have been described with reference to the drawings, it will be obvious to those skilled in the art that the embodiments can be implemented in other specific forms without changing the technical concept or essential feature of the present invention. Therefore, it should be construed that the aforementioned embodiments are provided for illustration, not limiting the scope of the present invention.

The carbon fiber-reinforced polymer composite according to various exemplary embodiments of the present invention may have similar or superior mechanical properties even without an additional reinforcing material such as glass fiber, thus being useful for most devices requiring weight reduction.

In particular, the polymer composite material may be suitable for a component of a transportation means such as a vehicle requiring both mechanical properties and weight reduction, and in particular, a component for forming a car body such as a seat frame, a roof frame, a cross beam or the like.

With the method of manufacturing the carbon fiber-reinforced polymer composite according to various exemplary embodiments of the present invention, the interfacial bonding force between the carbon fibers and the polymer may be improved without conducting pretreatment of carbon fibers, and damage to carbon fibers and discharge of waste may be avoided.

In addition, with the method of manufacturing the carbon fiber-reinforced polymer composite according to various exemplary embodiments of the present invention, the mechanical properties of the composite material may be significantly improved in spite of using a reduced amount of carbon fibers, thus being advantageous in weight reduction.

The effects of the present invention are not limited to those described above. It should be understood that the effects of the present invention include all effects that can be inferred from the description above.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:
1. A carbon fiber-reinforced polymer composite comprising:
a polymer; and
carbon fibers that are modified with a block copolymer represented by Formula 1 or Formula 2:

[Formula 1]

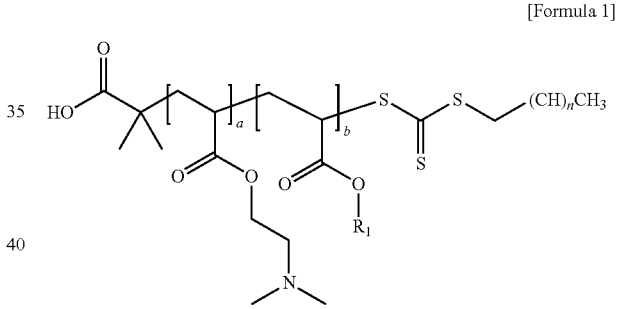

wherein, in Formula 1, a is an integer of 10 to 50 and b is an integer satisfying a≤b≤50 and $R_1$ is methyl or ethyl and n is an integer of 1 to 10,

[Formula 2]

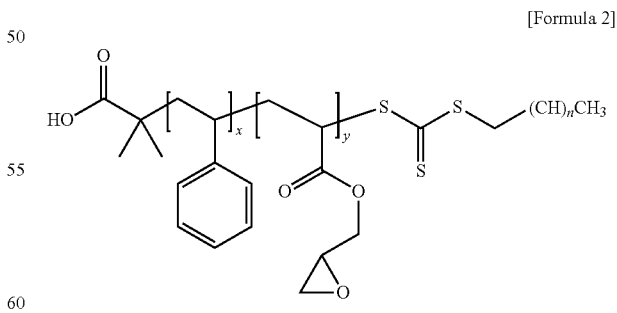

wherein, in Formula 2, x is an integer of 50 to 90 and y is an integer satisfying 10≤y≤x≤90 and n is an integer of 1 to 10,
wherein the carbon fibers are dispersed in the polymer.
2. The polymer composite material of claim 1, wherein the polymer is a thermoplastic or thermosetting polymer.

3. The polymer composite material of claim 1, wherein the block copolymer has a weight average molecular weight of about 10,000 to 50,000 g/mol.

4. The polymer composite material of claim 1, comprising:
an amount of about 45% by weight to 95% by weight of the polymer; and
an amount of about 5% by weight to 55% by weight of the surface-modified carbon fibers,
all the % by weights based on the total weight of the polymer composite material.

5. The polymer composite material of claim 1, further comprising an additive which is dispersed in the polymer and is selected from the group consisting of maleic anhydride-grafted polypropylene, a glass fiber, an antioxidant and a combination thereof.

6. A component for a vehicle comprising the carbon fiber-reinforced polymer composite of claim 1.

7. The component of claim 6, wherein the component is selected from the group consisting of a seat frame, a roof frame, a cross beam and a combination thereof.

8. A method of manufacturing a carbon fiber-reinforced polymer composite comprising:
modifying carbon fibers with a block copolymer represented by the following Formula 1 or 2; and
mixing the modified carbon fibers with a polymer,

[Formula 1]

wherein in Formula 1, a is an integer of 10 to 50 and b is an integer satisfying a≤b≤50; and $R_1$ is $C_1$-$C_{20}$ alkyl and n is an integer of 1 to 10,

[Formula 2]

wherein Formula 2, x is an integer of 50 to 90 and y is an integer satisfying 10≤y≤x≤90; and n is an integer of 1 to 10.

9. The method of claim 8, wherein $R_1$ is methyl or ethyl.

10. The method of claim 8, wherein the carbon fibers include at least one epoxy group on surfaces thereof or include no epoxy group on the surfaces thereof.

11. The method of claim 10, wherein, when the carbon fibers have at least one epoxy group, the carbon fibers are modified with about 100 parts by weight to 500 parts by weight of the block copolymer, based on 100 parts by weight of the epoxy group.

12. The method of claim 8, wherein the block copolymer has a weight average molecular weight of about 10,000 to 50,000 g/mol.

13. The method of claim 8, wherein the carbon fibers are modified by steps comprising:
dispersing the carbon fibers in a first solvent to form a dispersion;
dissolving the block copolymer in a second solvent to form a polymer solution;
mixing the dispersion with the polymer solution to form a mixture; and
stirring the mixture at a temperature of about 70° C. to 90° C. for about 2 to 4 hours.

14. The method of claim 8, wherein the carbon fibers are modified by steps comprising:
dissolving the block copolymer in a second solvent having a polarity of about 2.4 to 9.0 to form a polymer solution;
spraying the polymer solution on surfaces of the carbon fibers; and
mixing the carbon fibers with the solution at a temperature of about 70° C. to 90° C. for about 2 to 4 hours.

15. The method of claim 8, wherein the polymer is a thermoplastic or thermosetting polymer.

16. The method of claim 8, wherein an amount of about 5% by weight to 55% by weight of the modified carbon fibers are mixed with an amount of about 45% by weight to 95% by weight of the polymer, all the % by weight based on the total weight of the carbon fiber-reinforced polymer composite.

17. The method of claim 8, wherein the fibers are modified at a temperature of about 150° C. to 300° C. for about 30 minutes to 2 hours.

18. The method according to claim 8, further comprising:
mixing the modified carbon fibers and the polymer with an additive selected from the group consisting of maleic anhydride-grafted polypropylene, a glass fiber, an antioxidant and a combination thereof.

19. A carbon fiber-reinforced polymer composite obtained by a method of claim 8.

* * * * *